Feb. 20, 1945.    H. A. ROSE    2,370,075
VAPOR-ELECTRIC DEVICES
Filed June 10, 1943    3 Sheets-Sheet 2

WITNESSES:

INVENTOR
Herbert A. Rose.
BY
ATTORNEY

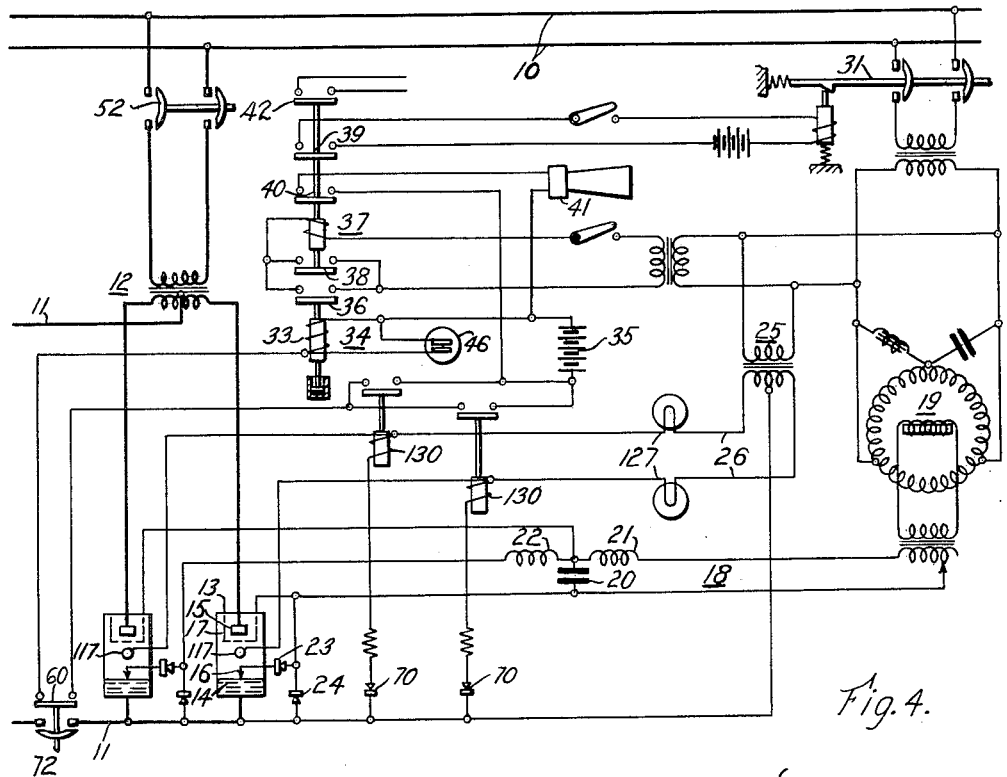

Patented Feb. 20, 1945

2,370,075

UNITED STATES PATENT OFFICE

2,370,075
VAPOR-ELECTRIC DEVICE

Herbert A. Rose, Pittsburgh 21, Pa., assignor to Westinghouse Electric & Manufacturing Company, East Pittsburgh, Pa., a corporation of Pennsylvania Application June 10, 1943, Serial No. 490,303

13 Claims. (Cl. 315—132)

My invention relates to a vapor-electric device and, particularly, to a missfire detector and control system for vapor-electric rectifiers.

In the operation of vapor-electric rectifiers of the make-alive types, occasional missfires occur. Various schemes have been heretofore devised to indicate when a rectifier valve missfires. These previous systems have all been based on the premise that the missfire would be indicated by a failure of the anode to assume current under normal loading conditions. The heretofore known systems have several objections, the principal of which is as follows:

It is difficult to work out a properly responsive detector for all classes of rectifiers because of the variable load conditions to which certain applications may be subject. For example, an industrial rectifier may be required to carry heavy loads most of the day but be subject to very light or essentially no load during the night. The missfire system should be capable of reliable operation under both types of loading as the indication of missfire under either load condition may have direct bearing on the quality of rectifier operation to be expected later under conditions of the other.

Anode may not necessarily be positive with respect to its cathode under certain types of load conditions at the time normal load conduction would ordinarily occur. Various conditions of light load (or not load) operation, variable bus voltage, low inductance regenerative loads, partially excited interphase transformer operation and variable starter delay are a few of the conditions under which an anode may fail to conduct current (missfire) even though its ignition and exciting system are functioning normally. Where these conditions represent normal circuit or load or application conditions, it is unreasonable to pronounce an anode "miss" as a "missfire."

It is difficult to obtain commercial reliability where the means of detection makes use of anode balance coil voltage for transformer connections in which a phase of the transformer supplies two or more anodes. This is particularly the case for fractional capacity operation of sections, light and no load operation, and heavier load conditions involving appreciable starter or grid delay.

To overcome these objections I propose to indicate only if the anode shield (or excitation anode or both) are operating properly. If the shield or excitation anode picks up, the main anode will assume load if it is of the correct polarity to do so.

In the system according to my invention, a relay is responsive to the current conditions obtained between the anode shield or an excitation anode at the moment when the main anode should carry current. This relay will normally be energized by the flow of current to the shield or excitation anode and will pick up its contacts which are in series with a timing device, usually a time delay relay. In the event of a missfire for a predetermined interval of time, this timing device will close its contacts and close a supervisory circuit which may indicate in any suitable manner that a missfire of serious proportions has occurred and/or operate a control circuit to take any suitable steps to protect the rectifier during the continuance of the missfire.

Accordingly, an object of my invention is to provide a supervisory system for detecting missfires in a vapor-electric device.

It is a further object of my invention to provide a control system responsive to missfires for operating a protective circuit for the rectifier.

It is a further object of my invention to provide a missfire detector which will signal the occurrence of minor and major missfires.

Other objects and advantages of my invention will be apparent from the following detailed description taken in conjunction with the accompanying drawings, in which:

Fig. 4 is a similar view showing a modification responsive to the potential obtained between the anode shield and the cathode instead of the current;

Fig. 5 is an illustration of the potentials and currents operative in a valve of a vapor-electric device;

Fig. 6 is a similar diagrammatic illustration of the voltages and currents utilized according to the modification of Fig. 4.

Figure 1:
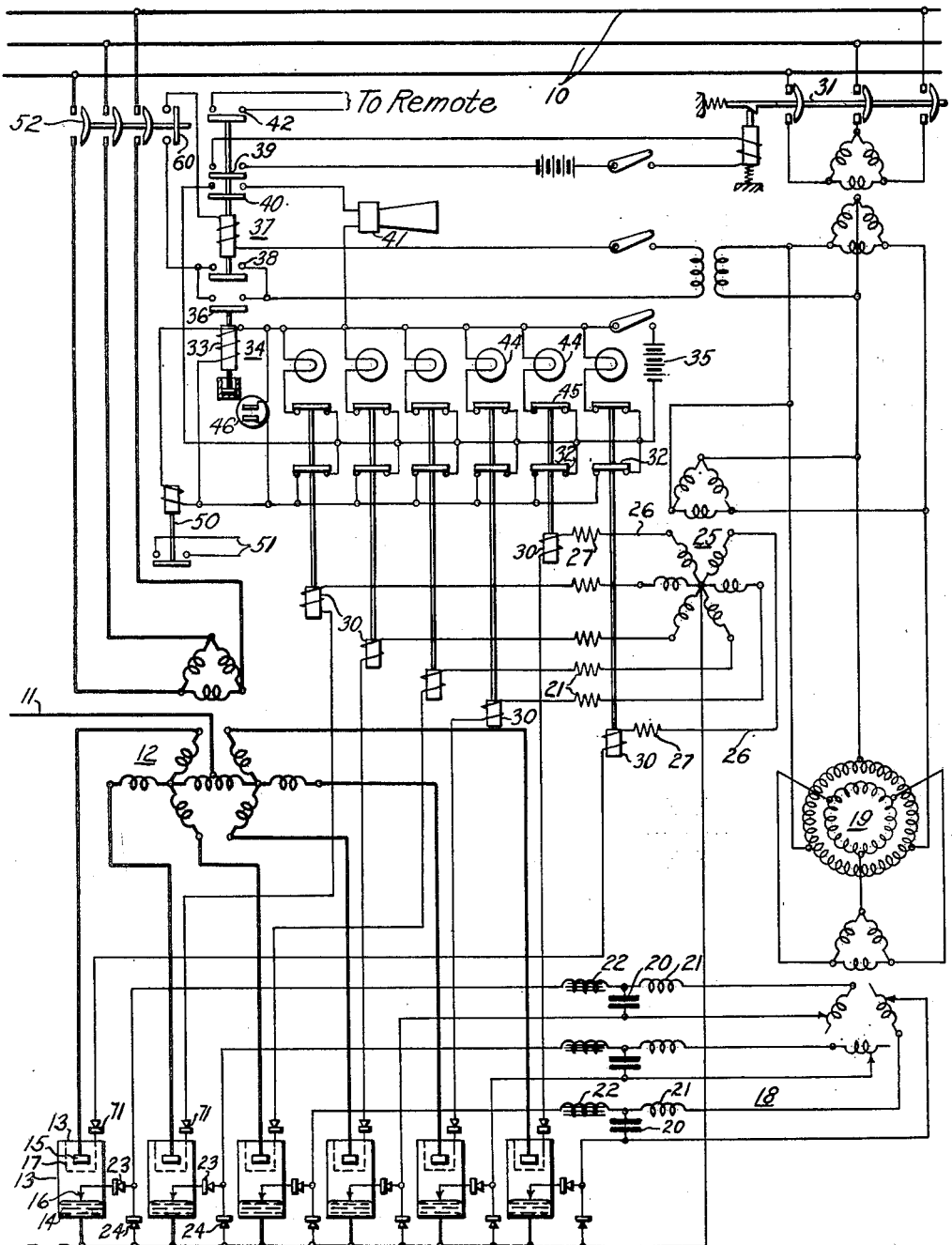
Figure 1 is a schematic illustration of a vappor-electric converter embodying my invention.

In the illustrative embodiment of my invention according to Fig. 1, an alternating-current circuit 10 is connected to a direct-current circuit 11 by means of a plurality of vapor-electric valves of the make-alive type. Current is distributed at the valves by means of a suitable rectifier transformer 12, and connection between the rectifier and the alternating-current circuit 10 is made by means of a circuit breaker 52, and the connection to the direct-current circuit 11 is made by means of a circuit breaker 72. Each valve of the converter preferably comprises an evacuated container 13 containing a pair of main anodes one of which is usually a vaporizable reconstructing cathode 14 of suitable material, such as mercury, while the other is a cooperating anode 15 usually of graphite. The cathode 14 main electrode is periodically excited by means of a make-alive electrode 16 extending into contact with the cathode material. The anode 15 is protected by a suitable shield 17 which usually is constructed of graphite and substantially encloses the anode 15.

The periodic excitation of the cathode 14 is secured by means of an impulsing device 18, preferably of the wave distorter type, which is connected between a suitable source of alternating-current potential, herein illustrated as a transformer energized from the alternating-current circuit 10 through a circuit breaker 31, usually through the medium of a phase shifting device 19, herein illustrated as of the induction phase shifting type.

A preferred wave distorter system 18 comprises a capacitor 20 charged through a suitable impedance 21 from the source of current and discharging to the make-alive electrode 16 through a non-linear impedance, preferably in the form of a saturable reactor 22. If desired, polarity selective means such as a rectox 23 in series with the make-alive electrode 16, and a second rectox 24 in shunt with the make-alive 16 and the series rectox 23 may be utilized so that a single wave distorter device 18 may be utilized for firing a pair of alternately conducting valves.

In order to render the valve conductive after the initiation of the cathode spot, it is necessary to apply suitable potential impulses to the anode shields 17. For accomplishing this I have provided a shield control transformer 25 and connecting circuits 26 energized from any suitable source such as the line 10 for periodically impressing potentials between the anode shields 17 or an auxiliary exciting electrode 117 and the cathode 14 of the valve.

In each of the shield supply circuits 26 I have provided a current limiting resistor 27 and a relay 30 responsive to the flow of current to the anode shields 17. In the embodiment according to Fig. 1, the relays 30 are of the normally closed type and the contacts 32 are opened by the flow of current in the shield excitation circuit 26. The contacts 32 of relays 30 are connected in parallel in series with the winding 33 of a time delay device herein illustrated as a time delay relay 34. When normal current flows to the anode shields 17, the shield current relays 30 will open their contacts 32 and maintain the timing device 34 unenergized. However, in the event of a missfire, the current to the shield 17 in one or more of the valves will be reduced to a value insufficient to maintain the relay 30 open, and the timing device 34 will be energized through the contact 32 of the relay 30 from any suitable source, herein indicated as a battery 35. If the missfire or an accumulated number of misses in various valves persists for a predetermined interval, the timing device 34 will close its contact 36, which, in turn, energizes a control relay 37 which closes and operates a contact 38 to lock itself in and also closes a control contact 39 to produce any suitable control action such as opening the circuit breaker 31 and closing down the rectifier. An auxiliary contact 40 energizes a horn 41 or other device to attract the attention of any attendant to the rectifier. Another auxiliary contact 42 may close a signal circuit to a remote control or other operating station.

It is frequently desirable to know when any one or more of the valves or rectifiers are missfiring, even though the missfires do not persist for a sufficient interval to necessitate protective control of the rectifier. To secure such indication I have provided an indicating device in the form of suitable lamps 44 which are controlled by auxiliary contacts 45 on the shield current relay 30. By this means an attendant by looking at the signals 44 can find out which of the several valves is subject to missfire. It is also desirable to know the operative condition of the timing device 34, and for this purpose, I prefer to install a signal such as a glow lamp 46 in shunt with the operating coil 33 of the timing device 34.

When the rectifier is operated by remote control, it is desirable to have indication of the instantaneous condition of the rectifier at the remote control station. For this purpose the indicator in shunt with the timing device may be utilized, or a special enunciator in the form of a relay 50 might be utilized to close an indicating circuit 51 to a remote control system.

In the usual installation the signals 44 would be mounted in or on the control cabinet of the rectifier so that the service man can locate which valve or valves is undergoing the missfire while signal 46 would be in the attendant's office and indicate the desirability of sending the service man to check on operation while the remote control indicators would be located in the load or control center and allow the operator to adjust or shift the load or take any other steps that may be required to protect the rectifier.

To prevent operation of the indicating and control system during normal shutdown of the device, I prefer to utilize an interlock 60 between the control or supervisory circuit and some portion of the main rectifier system such as the alternating-current circuit breaker 52 or the direct-current circuit breaker 72.

Figure 2:
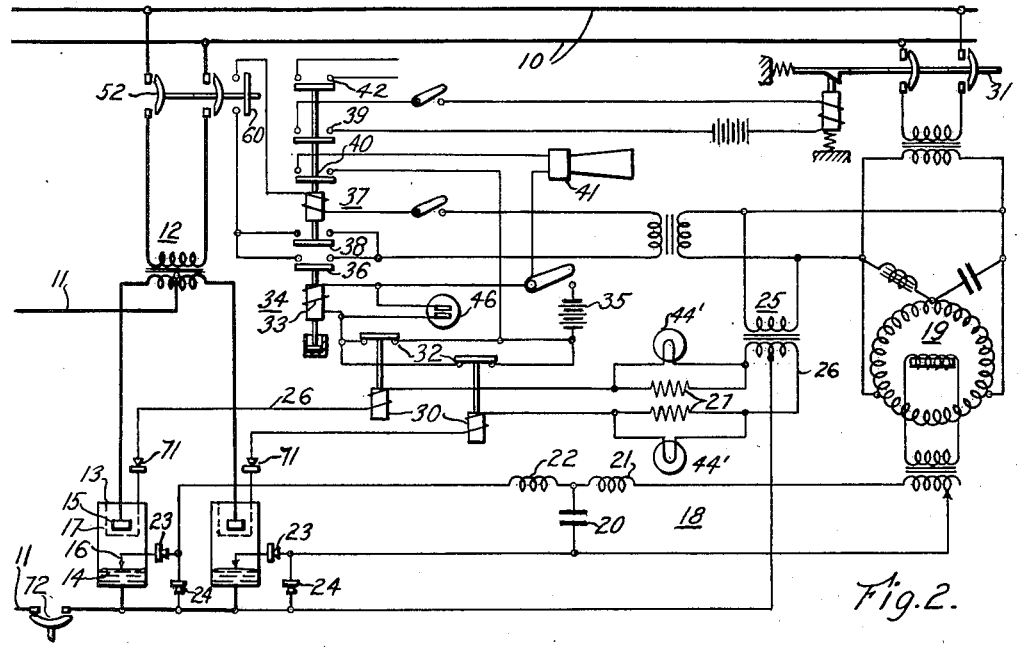
Fig. 2 is a modification showing a simplified converter according to my invention.
Figure 3:
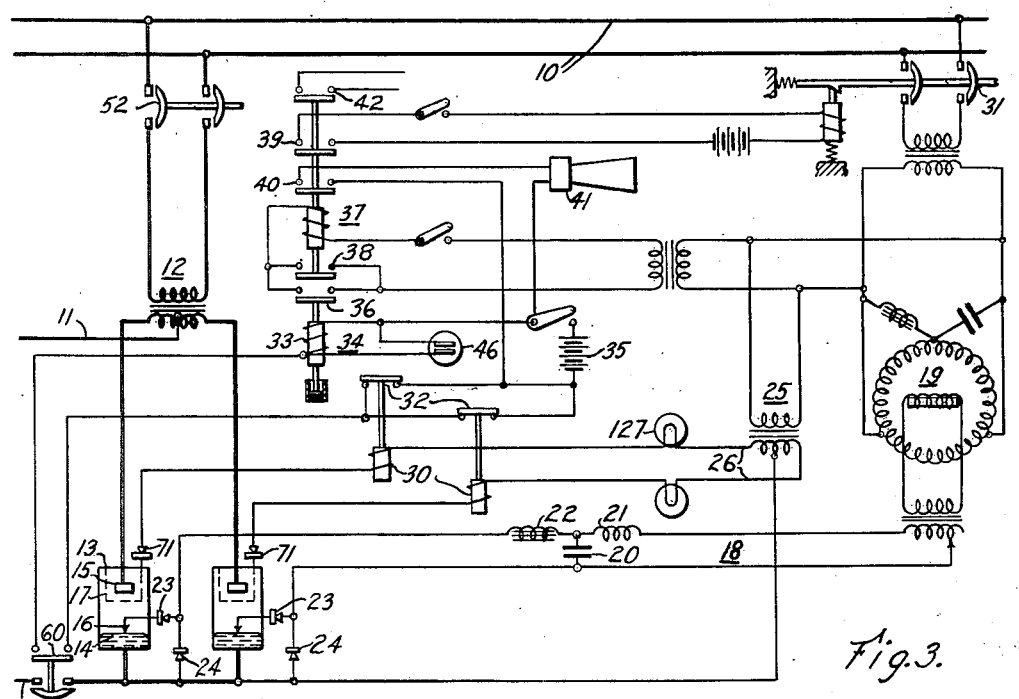
Fig. 3 is a similar view showing a further modification.

While I have shown this interlock operative only on the control system in Figs. 1 and 2, it might very well be operative on the detector system as shown in Figs. 3 and 4 and, therefore, prevent the loss of energy in the detector system when the interlocked devices are opened.

In the operation of this detector and control system according to my invention, the impulsing device 18 excites the cathode 14 and the shield impulsing device 25 applies a potential between the anode shield 17 or an auxiliary exciting electrode 117, and the normal current flow between the shield 17 or the electrode 117 and the cathode 14 produces a conductive condition within the valve so that if the anode and the load circuit are of the right conditions, a main anode current will flow. If the conductive conditions are established in the valve, the shield current relay 30 will remain picked up, and the timing device 34 will be maintained in inoperative condition, and, consequently, the control circuits will be inoperative. However, if the conductive conditions in one or more valves should fail to be established, the shield current relays 30 will energize the timing device 34, and ultimately energize the control system which will take the necessary protective measures. An attendant desiring to know which of the valves is undergoing a missfire need only look at the indicator lamps 44 to tell which of the valves is faulty. Also, the indicator in shunt with the timing device 34 will disclose the operative condition of the timing device itself, and obviously the horn will announce the operation of the control devices.

In the modification according to Fig. 1, the indicating devices 44 for the individual valves are of the normally dark type. Therefore, if the signal device 44 should be burned out or otherwise inoperative, no signal would be given. This may be remedied by providing a constantly energized signal lamp 44', preferably in shunt with the impedance 27 in the shield supply circuit 26.

In the modification shown in Fig. 2, the failure of the valve will be indicated by a dark signal 44'. Instead of utilizing a signal 44' in shunt with an impedance 27, the signal 127 itself may be the impedance, as indicated in Fig. 3.

Instead of utilizing the current flow through the shield 17 or excitation electrode 117, the potential obtained between the shield 17 or excitation electrode 117 and the cathode 14 may be used as the detecting means. As shown in Fig. 4, the shield phase transformer voltage is applied between the exciting electrode 117 and the cathode 14. If there is a failure of excitation, this full potential appears between the shield 17 or excitation anode 117 and the cathode 14. However, if excitation is properly accomplished, the potential between the shield and the cathode drops to a low potential as shown in Fig. 6, usually arc drop potential, and a relay coil 130 connected in shunt between the shield 17 and the cathode 14 will be subject to this potential. A suitable unidirectional conductor 70 such as a rectox is usually provided in the shunt circuit to prevent reverse current flow through the detecting relay to increase its sensitivity to this condition.

As seen from Fig. 5, the shield current conditions from no load to full load varies only in the fact that during the normal load conducting interval, there is a slight negative or back current to the shield at the termination of each main conducting period. The sensitivity of the relay 30 may be increased by cutting off this reverse current flow by any suitable means such as a unidirectional conductor 71, usually in the form of a rectox in series with the shield excitation circuit 26.

While for purposes of illustration I have shown and described specific embodiments of my invention, it will be apparent that changes and modifications may be made therein without departing from the true spirit of my invention or the scope of the appended claims.

I claim as my invention:

1. An electric conversion system comprising a plurality of vapor-electric valves, each of said valves including a main anode and cathode, a make-alive electrode associated with the cathode, and an anode shield, means for impressing a potential between said main anode and cathode, impulsing means for periodically applying a current impulse to said make-alive electrode, circuit means for applying potential between said anode shield and the cathode, relay means responsive to current flow in said circuit, a timing means energized by said relays and control means energized by said timing means after said relay has maintained said timing means energized for a predetermined interval.

2. An electric conversion system comprising a plurality of vapor-electric valves, each of said valves including a main anode and cathode, a make-alive electrode associated with the cathode, and an anode shield, means for impressing a potential between said main anode and cathode, impulsing means for periodically applying a current impulse to said make-alive electrode, circuit means for applying potential between said anode shield and the cathode, relay means responsive to current flow in said circuit, a timing means energized by said relays and control means energized by said timing means after said relay has maintained said timing means energized for a predetermined interval, and indicating means for each of the relays.

3. An electric conversion system comprising a plurality of vapor-electric valves, each of said valves including a main anode and cathode, a make-alive electrode associated with the cathode, and an anode shield, means for impressing a potential between said main anode and cathode, impulsing means for periodically applying a current impulse to said make-alive electrode, circuit means for applying potential between said anode shield and the cathode, relay means responsive to current flow in said circuit, a timing means energized by said relays and control means energized by said timing means after said relay has maintained said timing means energized for a predetermined interval, indicating means for each of the relays, and means for inhibiting operation of said control means when said conversion system is deenergized.

4. An electric translating system comprising a plurality of electric valves, each of said valves including a main anode, a cathode, and a shield for said anode, means for sequentially applying make-alive energy to said cathode, means for applying periodic current impulses between said shield and said cathode, a relay for each of said shields, said relays being responsive to current flow to said shields, a timing device energized by said relays and supervisory means energized by said timing device.

5. An electric conversion system comprising a plurality of vapor-electric valves, each of said valves including a main anode and cathode, a make-alive electrode associated with the cathode, and an anode shield, means for impressing a potential between said main anode and cathode, impulsing means for periodically applying a current impulse to said make-alive electrode, circuit means for applying potential between said anode shield and the cathode, relay means responsive to current flow in said circuit, a timing means energized by said relays and control means energized by said timing means after said relay has maintained said timing means energized for a predetermined interval, switching means in series with said valves and interlocking means between said switching means and said control means.

6. An electric conversion system comprising a plurality of vapor-electric valves, each of said valves including a main anode and cathode, a make-alive electrode associated with the cathode, and an anode shield, means for impressing a potential between said main anode and cathode, impulsing means for periodically applying a current impulse to said make-alive electrode, circuit means for applying potential between said anode shield and the cathode, relay means responsive to current flow in said circuit, and indicating means for each of the relays.

7. An electric translating system comprising a plurality of electric valves, each of said valves including a main anode, a cathode, and a shield for said anode, means for sequentially applying make-alive energy to said cathodes, means for applying periodic current impulses between said shield and said cathode, a relay for each of said shields, said relays being responsive to current flow to said shields, a timing device energized by said relays and supervisory means energized by said timing device, and means for rendering said supervisory means inoperative when said system is deenergized.

8. An electric translating system comprising a plurality of electric valves, each of said valves including a main anode, a cathode, and a shield for said anode, means for sequentially applying make-alive energy to said cathodes, means for applying periodic current impulses between said shield and said cathode, a relay for each of said shields, said relays being responsive to current flow to said shields, a timing device energized by said relays and supervisory means energized by said timing device, means for rendering said supervisory means inoperative when said system is deenergized, and indicating means for said timing device.

9. A supervisory system for a vapor-electric valve having at least a pair of main electrodes, an exciting electrode and an anode shield comprising means for periodically energizing the exciting electrode, circuit means for periodically applying potential between said shield and one of said main electrodes, a relay responsive to current conditions in said circuit means, a timing device, the energization of which is controlled by said relay and a supervisory circuit energized through said timing device.

10. A supervisory system for a vapor-electric valve having at least a pair of main electrodes, an exciting electrode and an auxiliary electrode comprising means for periodically energizing the exciting electrode, circuit means for periodically applying potential between said auxiliary electrode and one of said main electrodes, a relay responsive to current conditions in said circuit means, a timing device, the energization of which is controlled by said relay and a supervisory circuit energized through said timing device, and indicating means in shunt with said timing device.

11. An electric translating system including a vapor-electric valve having a pair of main electrodes, a control electrode, a shield for one of said main electrodes, circuit means for impressing a control current on said control electrode for periodically establishing emissivity at one of said main electrodes, circuit means for impressing a potential on said shield for establishing conductive conditions in said valve, relay means responsive to the establishing of conductive conditions in said valve, and a control circuit energized by a predetermined operation of said relay means.

12. An electric translating system including a vapor-electric valve having a pair of main electrodes, a control electrode, a shield for one of said main electrodes, circuit means for impressing a control current on said control electrode for periodically establishing emissivity at one of said main electrodes, circuit means for impressing a potential on said shield for establishing conductive conditions in said valve, relay means responsive to the establishing of conductive conditions in said valve, and a control circuit energized by a predetermined operation of said relay means, and means for indicating the operative condition of said relay means.

13. An electric translating system including a vapor-electric valve having a pair of main electrodes, a control electrode, a shield for one of said main electrodes, circuit means for impressing a control current on said control electrode for periodically establishing emissivity at one of said main electrodes, circuit means for impressing a potential on said shield for establishing conductive conditions in said valve, relay means responsive to the establishing of conductive conditions in said valve, and a second relay means for energizing a control circuit by said first relay after a predetermined interval.

HERBERT A. ROSE.